July 22, 1958     G. H. DARRELL     2,844,805
PLUG LOCKING AND PROTECTING DEVICE
Filed Feb. 17, 1956

INVENTOR.
George H. Darrell
BY
Kenway, Jenney, Witter & Hildreth
Attys.

United States Patent Office 2,844,805
Patented July 22, 1958

2,844,805

PLUG LOCKING AND PROTECTING DEVICE

George H. Darrell, Dedham, Mass.

Application February 17, 1956, Serial No. 566,116

4 Claims. (Cl. 339—37)

This invention comprises a new and improved locking and protecting device for plugs used in making connection with the sockets in an electric lighting or power circuit.

There are many occasions in which it is desired to prevent the unauthorized use of electric apparatus such, for example, as television sets, electric heaters, air conditioners, instruments, etc. There are also situations in which it is important to safeguard the easily bent tines of electric plugs as at night or on shipboard where they are pulled out from their sockets and likely to get walked on and so damaged and unfitted for quick connection.

An object of the present invention is to provide a protecting device into which the tines of the plug may be inserted and safely held and in which they may be locked if desired in inoperative condition. Further, the device of my invention is so designed that it may be inexpensively manufactured as well as pleasing in appearance and convenient and effective in use. In one aspect, therefore, the device comprises a two-part casing having an aperture open at one end with one or more tine-engaging elements projecting transversely from the parts into the aperture for interlocking with the tines, and means for registering and, if desired, for locking the two parts of the casing together with the tines of the plug held in the aperture.

Figure 1:
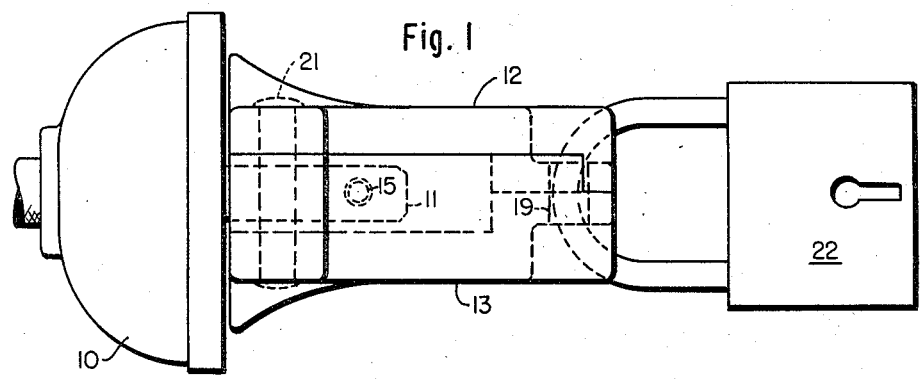
Figure 2:
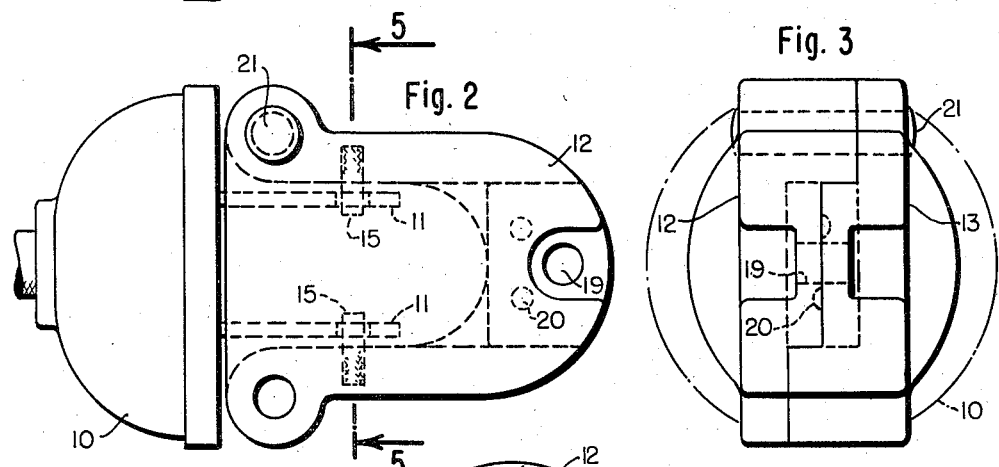
Figure 3:
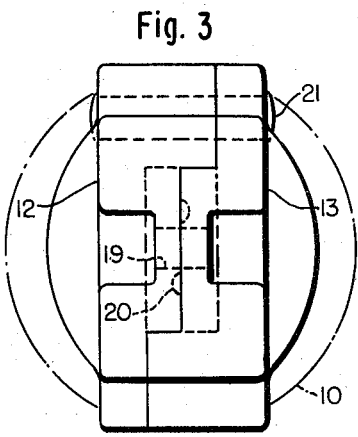
Figure 4:
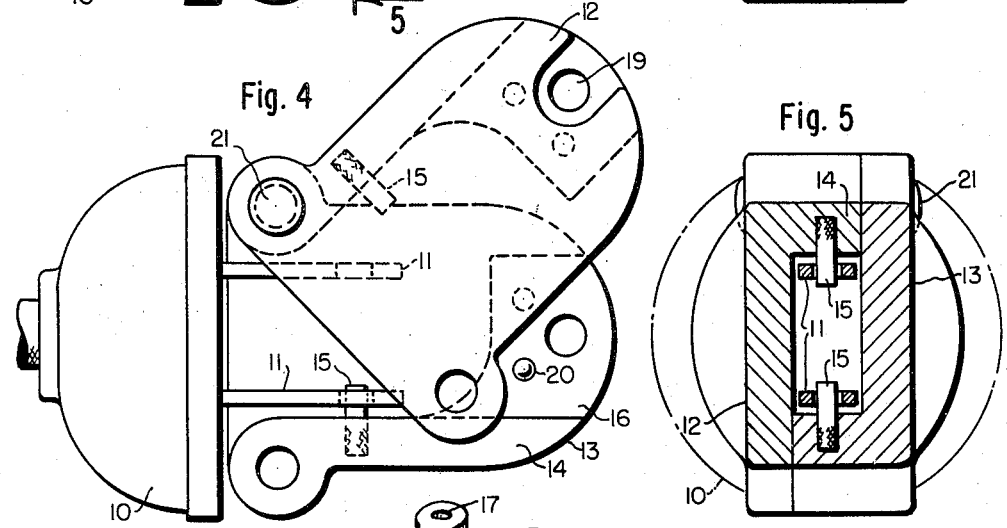
Figure 5:
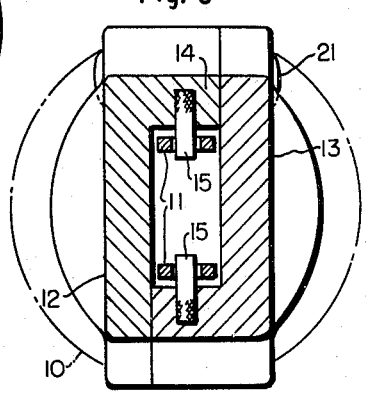
Figure 6:
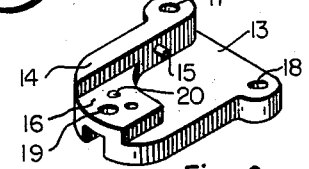

These and other features of the invention will be best understood and appreciated from the following description of a preferred embodiment thereof selected for purposes of illustration and shown in the accompanying drawings in which:

Fig. 1 is a view in elevation showing the device locked with a plug engaged therein, all on an enlarged scale, Fig. 2 is a similar plan view of the device with the lock omitted, Fig. 3 is an end view, Fig. 4 is a plan view showing the device in unlocked condition, and partially opened, Fig. 5 is a view in cross-section on the line 5—5 of Fig. 2, and Fig. 6 is a view in perspective of one of the casing parts shown in substantially actual size.

A conventional form of plug 10 is shown in the drawings as having a pair of parallel projecting tines 11 provided with perforations adjacent their outer ends, the perforated tines being characteristic of all plugs of this general type and being constructed of strip brass or copper.

The protecting or locking device as herein shown may be advantageously molded from synthetic resinous material and comprises two supplementary casing parts 12 and 13 herein shown as identical in shape. The lower of these parts as shown in Figs. 4 and 6 has a projecting marginal rib 14 along one side from which projects transversely a pin 15. The rib 14 merges at one end into a raised area 16 and at the other into an ear having a hole 17. At its other side the body of the casing part 13 has a corresponding hole 18 which, when the parts are assembled, receives a pivot pin 21. The part 13 is provided in its raised area 16 with a countersunk padlock hole 19 and in its surface a recess and a slightly projecting detent 20 adjacent thereto.

The upper casing part 12 as herein shown corresponds eractly with the part 13 already described. When the two parts are assembled their marginal ribs and raised areas form an open-end aperture of the proper dimensions to receive the tines 11 of the plug as will be apparent from an inspection of Figs. 2 and 5. A pivot pin 21 is inserted through the hole 18 of the part 13 and the corresponding hole in the rib of the part 12. The pivot pin is headed so that the parts are held permanently together but permitted to swing as indicated in Fig. 4 so as to open the aperture and expose the tines 11 of the plug. The recess and the corresponding detent 20 of the part 12 serve to register the two casing parts when they are swung into closed position and to register the hole 19 of the part 13 with the corresponding hole of the part 12 for the reception of the loop of the padlock 22 as shown in Fig. 1.

When the casing parts are swung into open position as shown in Fig. 4 the tines 11 of the plug may be impaled upon pins 15 by slightly springing the tines to bring their perforations over the pins. The two casing parts may then be swung into closed position and locked if desired by the padlock 22. Thus the tines 11 of the plug are positively retained within the recess of the locking device where they are completely safeguarded against being bent and positively held against removal.

It will be understood that the small detent in the raised area of one casing part comes opposite to the small recess in the raised area of the other casing part and they thus provide a pair of catches that releasably register the two parts when they are symmetrically superposed in their closed position. The loop of the padlock 22 likewise registers the casing parts and, of course, also locks them in registered position.

Having thus disclosed my invention and described in detail a preferred embodiment thereof I claim as new and desire to secure by Letters Patent:

1. A plug locking device comprising a pair of similar casing parts of resinous plastic material each having a hole for a padlock, a margnal rib on one side and a raised area at one end, the rib on one part facing the rib on the other part and together forming an open-end aperture to receive the perforated tines of an electric plug, a pivot pin connecting the parts at one side of the device, at least one pin in the aperture for engaging and holding a tine of the plug, and means for registering the casing parts in their closed position.

2. A plug locking device comprising a pair of supplementary casing parts of resinous plastic material each having a hole for a padlock and a marginal rib on one side, the rib on one part facing the rib on the other part and together forming an open-end aperture to receive the perforated tines of an electric plug, a pivot pin connecting the parts at one side of the device, at least one pin in the aperture for engaging and holding a tine of the plug, and means for registering the casing parts in their closed position.

3. A plug locking device comprising two supplementary casing parts having opposed ribs providing an aperture open at one end, a tine-engaging element fixed in one part and projecting transversely into the aperture, means connecting the parts of the casing for pivotal movement to and from superposed relation, and means for locking the casing parts together when in superposed relation.

4. A plug locking device comprising two similar casing parts of synthetic resinous material pivotally connected to slide one on the other in superposed relation and shaped to provide together an open end aperture for receiving the tines of an electric plug; means fixed to a casing part and located within said aperture for interlocking with a tine of the plug, and a detent for latching the casing parts in closed position, the two parts having padlock holes that register when they occupy their latched position.

References Cited in the file of this patent

UNITED STATES PATENTS

| | | |
|---|---|---|
| 457,761 | Dillon | Aug. 11, 1891 |
| 863,847 | Hatfield | Aug. 20, 1907 |
| 2,435,341 | Crumrine | Feb. 3, 1948 |
| 2,643,787 | Rockman | June 30, 1953 |
| 2,654,073 | Katz | Sept. 29, 1953 |
| 2,733,416 | Evalt | Jan. 31, 1956 |
| 2,785,386 | Mason | Mar. 12, 1957 |

FOREIGN PATENTS

| | | |
|---|---|---|
| 509,276 | Germany | Nov. 29, 1928 |